United States Patent [19]

Young

[11] Patent Number: 5,095,304

[45] Date of Patent: Mar. 10, 1992

[54] MATRIX DISPLAY DEVICE

[75] Inventor: Nigel D. Young, Meadvale Redhill, England

[73] Assignee: U.S. Philips Corporation, New York, N.Y.

[21] Appl. No.: 411,429

[22] Filed: Sep. 22, 1989

[30] Foreign Application Priority Data

Oct. 7, 1988 [GB] United Kingdom ................. 8823600

[51] Int. Cl.[5] .............................................. G09G 3/06
[52] U.S. Cl. .................................... 340/766; 340/783; 340/784
[58] Field of Search ................... 340/784, 765, 825.81, 340/783, 782, 781, 771, 766, 719, 718; 350/333, 332, 334, 336; 358/236, 241

[56]   References Cited
U.S. PATENT DOCUMENTS 4,822,142  4/1989  Yasui ................................. 350/333
4,917,467  4/1990  Chen et al. .......................... 350/332

Primary Examiner—Alvin E. Oberley
Assistant Examiner—Jick Chin
Attorney, Agent, or Firm—Robert J. Kraus

[57] ABSTRACT

In an active matrix addressed electro-optical, e.g. LC, display device of the kind comprising a row and column array of picture elements (12) each associated with a switching transistor (11) to which switching and data signals are supplied via switching and data signal conductors (14, 15) the transistors associated with alternate rows of picture elements are of opposite conductivity type (n,p) and the transistors of separate adjacent pairs of rows share a common switching signal conductor (14) to which switching signals for both conductivity types of transistors are applied, thereby reducing the number of such conductors. The transistors can be polysilicon or a-Si TFTs, or MOSFETs. CMOS technology may be used to produce also an integrated driver circuit (20).

20 Claims, 2 Drawing Sheets

MATRIX DISPLAY DEVICE

BACKGROUND OF THE INVENTION

This invention relates to a matrix display device comprising a row and column array of electro-optical picture elements defined by opposing electrodes with an electro-optical display medium disposed therebetween, and a switching transistor for each picture element to which switching and data signals are supplied from driver means via a switching signal conductor and a data signal conductor.

A matrix display device of this kind is suitable for displaying alpha-numeric or video (for example, TV) information using passive electro-optical display material such as liquid crystal material, electrophoretic suspensions and electrochromic materials, or light-emitting, for example electroluminescent, display material. Such active matrix addressed display device may typically consist of a matrix array of a very large number, for example around 200,000 or more, picture elements.

In a known example of such a matrix display device in which the electro-optical medium comprises liquid crystal material, each picture element is defined by a respective electrode carried on one substrate and a facing portion of an electrode common to all picture elements carried on another substrate. The switching elements comprise thin film transistors (TFTs), having substantially identical operational characteristics and which are arranged adjacent their associated picture element electrodes on the one substrate in an array of row and columns with the drain of each TFT being connected to its associated picture element electrode. The sources of all TFTs associated with one column of picture elements are connected to a respective one of a set of parallel column (data signal) conductors and the gates of all TFTs associated with one row of picture elements are connected to a respective one of a set of parallel row (switching signal) conductors extending at right angles to the set of column conductors. The row conductors are repetitively scanned in sequential fashion with a switching signal so as to turn "on" all TFTs in each row in turn and data signals, derived for example by sampling the corresponding TV line signal in the case of TV display, are applied to the column conductors as appropriate for each row in turn to build up a display picture. When the TFTs are turned "on", the picture element electrodes of the row concerned charge up to the applied column (data) voltage. When the switching signal disappears the TFTs are turned "off", thus isolating the picture element electrodes of the row so that charge is stored on each picture element. The picture elements stay in the state in to which they were driven, until the next time the TFTs are addressed, this usually being in the subsequent field period.

It will be appreciated that with the above-described display device the minimum number of rows and column conductors necessary corresponds to the number of rows and columns respectively of picture elements. In addition to the need therefore to devote a proportion of the area of the display device to the accommodation of the row and column conductors, there is also a possibility that in view of the large number of conductors involved one or more could prove defective, perhaps rendering the device unusable. Obviously, the more conductors employed, the greater this possibility becomes so that with comparatively large area display devices yields can be seriously effected.

Furthermore, the numbers of row and column conductors necessary can also cause difficulties with the production of high resolution, small area display devices such as small area LC display devices intended for use in a projection system. For such a purpose a small area LC display device having a very compact array of picture elements is required to provide sufficient picture element density for adequate resolution after projection. In conventional LC display devices the provision of a compact array of picture elements is hindered by the numbers of row and column conductors needed and the area they occupy.

It is an object of the present invention to provide an active matrix addressed display device in which fewer address conductors need be provided.

SUMMARY OF THE INVENTION

According to the present invention a matrix display device of the kind referred to in the opening paragraph is characterized in that for at least one pair of adjacent rows of picture elements the switching transistors associated with each row respectively are of opposite conductivity type and in that the switching transistors of both rows are connected to a common switching signal conductor to which switching signals for both types of switching transistors are supplied.

This arrangement results in a reduction in the number of switching signal conductors.

In an embodiment the transistors associated with one row of the two adjacent rows of picture elements for example comprise n-channel MOS transistors and the transistors associated with the other row comprise p-channel MOS transistors. The two kinds of transistors are turned on respectively by means of switching signals consisting of positive and negative polarity gating pulses supplied to the common switching signal conductor. Thus the one row of picture elements is addressed by providing on the conductor a gating pulse of one polarity, whereupon the transistors concerned are turned on allowing the picture elements concerned to be loaded with display information in accordance with the values of data signals then existing on their associated data signal conductors, and thereafter the other row of picture elements is addressed by providing a temporally distinct gating pulse of opposite polarity to the conductor to turn on the transistors of the other row, thereby allowing the picture elements of the other row to be loaded with display information in similar manner while the transistors of the one row are turned off at the termination of the one polarity gating pulse to isolate their picture elements.

The duration of each of the two gating pulses can be the same as that of a row switching signal in a conventional display device, for example corresponding approximately with conventional TV line period in the case of a TV display.

When this scheme is applied to all rows of picture elements throughout the display device such that each separate pair of adjacent rows of picture elements respectively uses a common switching signal conductor, the number of switching signal conductors which needs to be provided compared with the known display device is halved. As a result significant advantages are achieved. The risk of a defective switching conductor, for example through a short circuit with a data signal conductor at a cross-over between the conductors in the case where the switching signal and data signal conductors physically cross one another, is reduced accordingly. Also, interconnection between the switching signal conductors and their associated driver circuitry is simplified.

In addition, because the need to provide a switching signal conductor extending between each and every pair of adjacent rows of picture elements is avoided, rows of picture elements can be packed closer together, enabling high densities to be achieved so that a more compact display device, suitable, for example, for use in a projection system, can be obtained.

Alternatively, space which in effect becomes available through the reduction in the number of switching signal conductors could be utilized to increase the size of the picture element electrodes and hence the active display area of the device or, if desired, to provide at least some duplicated switching signal conductors for redundancy purposes by forming secondary switching signal conductors in parallel with the primary conductors so that if a part of a primary conductor is defective it can be disconnected, e.g. by laser scribing, leaving the duplicate conductor to maintain proper operation of the rows of picture elements concerned.

The switching transistors may comprise TFTs, fabricated on a common, insulative, substrate, for example of quartz or glass, or MOSFETs formed on a semiconductor, e.g. silicon, substrate, although it is envisaged that other types of transistors might be used as will be apparent to persons skilled in the art.

As regards TFTs, opposing conductivity types can conveniently be formed using polysilicon. An example of a polysilicon TFT intended for use as a switching element in an active matrix addressed LC display device and its method of fabrication are described in a paper entitled "Polycrystalline-Silicon Thin Film Transistors on Glass" by M. Matsui et al, published in Appl. Phys. Lett. 37(10), 15 Nov. 1980 to which reference is invited. In the described method, TFTs are formed on glass using polycrystalline silicon produced by a molecular beam epitaxy technique and it is said that the conduction type can be controlled by using dopants. Further examples of polysilicon TFTs for use as switches in LC display devices are given in the paper entitled "Progress in Active Matrix Addressing of LCDs" by P. Migliorato published in the Proceedings of Eurodisplay 1987 at pages 44 to 54, and in the paper entitled "Low Temperature Fabrication of Polysilicon Active Matrix LC Displays" by A. C. Ipri et al also published in the Proceedings of Eurodisplay 1987 at pages 188 to 189 to which reference is also invited.

The TFTs may instead comprise amorphous silicon TFTs. Amorphous silicon TFTs can be made n or p type by in situ phosphine or diborane doping.

The provision of both conductivity type transistors in the display device in accordance with the invention obviously adds to the complexity of fabrication compared with a display device whose switching transistors are all of one type. However it has been proposed that the data and switching signal drive circuits of matrix display devices, consisting of shift register circuits, be incorporated on the same substrate as the switching transistors, but outside the area occupied by the picture elements, in order to obtain compactness, to reduce costs and to improve reliability. Integrated drivers, as they are known, comprising polysilicon devices using PMOS and NMOS technology have been produced. It has also been proposed, as described in two of the aforementioned papers, that the drive circuits be produced using a CMOS process. Of course, when using a CMOS process, the provision of both n and p channel polysilicon TFTs for the switching transistors becomes relatively easy and without causing any significant extra processing.

Methods of producing n and p channel polysilicon using CMOS processes are described in the A. C. Ipri et al paper mentioned previously and in a paper entitled "Active Matrix Addressed Liquid Crystal Displays" presented by S. Morozumi at the 1985 International Display Research Conference and published in the conference record at pages 9 to 13.

Whilst polysilicon or a-Si TFTs are preferred for the switching transistors, they could instead comprise MOSFETs formed on a single crystal silicon substrate using a CMOS process in a manner known per se.

BRIEF DESCRIPTION OF THE DRAWINGS

An embodiment of a matrix display device in accordance with the invention will now be described, by way of example, with reference to the accompanying drawings, in which.

DETAILED DESCRIPTION OF A PREFERRED EMBODIMENT OF THE INVENTION

Figure 1:
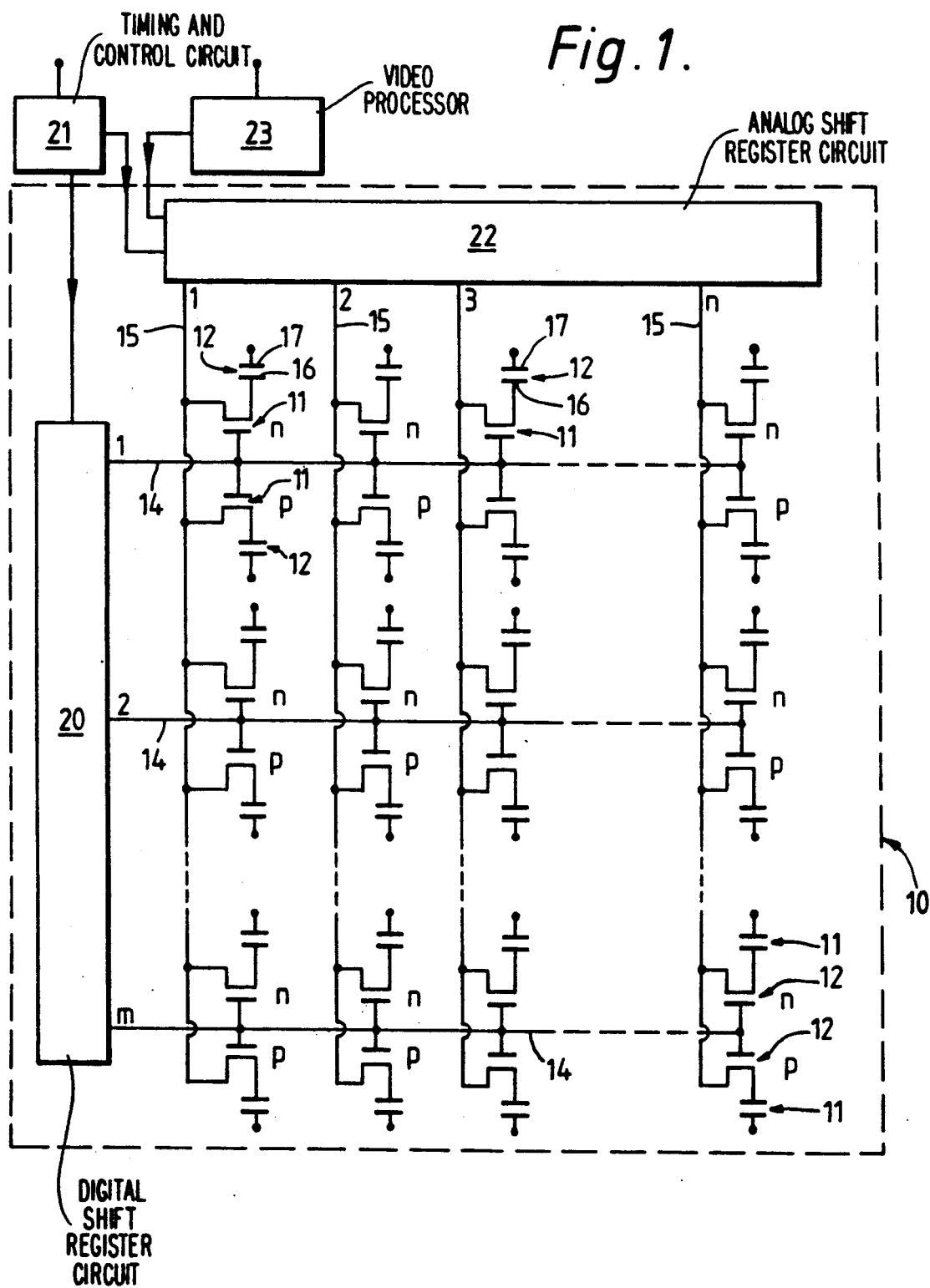
FIG. 1 shows schematically and in simplified block form a liquid crystal matrix display device according to the invention having a column and row array of picture elements addressed via sets of row and column conductors and respective switching transistors.

Referring to FIG. 1, the matrix display device, which is suitable for displaying video e.g. TV pictures, comprises an active matrix addressed liquid crystal display panel 10 which consist of m rows (1 to m) with n horizontally arranged picture elements 12 (1 to n) in each row. Only a few of the picture elements are shown for simplicity. In practice, the total number of picture elements (m×n) in the matrix array may be 200,000 or more.

Each picture element 12 has associated therewith a switching transistor 11, comprising in this embodiment a TFT, for example a polysilicon TFT, which serves to control the application of data signal voltages to the picture element. The switching transistors 11 are controlled via row conductors 14 which are supplied with gating signals as will be described and to which the gates of the switching transistors are connected. The switching transistors 11 associated with all picture elements 12 in a column are connected to a respective common column conductor 15 to which data signal voltages for the picture elements concerned are supplied. Thus there are n column conductors 15. The two sets of row and column conductors extend at right angles to one another.

Outputs from the switching transistors 11 are connected to an electrode 16 of their respective picture elements carried on a substrate of the device together with the conductors 14 and 15 and the switching transistors 11. A counter electrode 17 common to all picture elements is carried on another substrate parallel to, and spaced from, this one substrate with TN liquid crystal material disposed therebetween. The opposing substrates are of transparent insulative material, for example glass or quartz, and are provided with polarizer and analyzer layers in conventional manner. The liquid crystal material modulates light transmitted through the picture elements according to the voltage applied thereacross, with each picture element, defined by a respective electrode 16 on one substrate, an opposing portion of the common electrode 17 on the other substrate and liquid crystal material therebetween, being operable to vary light transmission through the panel in accordance with a drive voltage applied across its respective electrodes. The device is driven on a row at a time basis by scanning the row conductors 14 sequentially with gating signals so as to turn on all the switching transistors in each row in turn and applying data signals to the column conductors for each row of picture elements in turn as appropriate and in synchronism with the gating signals so as to build up a complete display picture. In the case of a TV display these data signals comprise video information signals with each row of picture elements being provided with video information signals corresponding to a TV line. Using one row at a time addressing each switching transistor 11 of the addressed row is switched on for a time Tl during which the video information signals are transferred from the column conductors 15 to the display elements 12. During the remainder of the field time Tf (Tf being approximately equal to m.Tl) the switching transistors are off and their function is to keep the video information voltage across the liquid crystal by virtue of the natural capacitance of the display element. Following addressing of a row and the termination of the gating signal, the switching transistors 11 of the row turn off thereby isolating the picture elements from the conductors 15 and ensuring the applied charge is stored on the picture elements until the next time the switching transistors are addressed in the next field period.

The row conductors are addressed with gating signals by a digital shift register circuit 20 supplied with regular timing pulses from a timing and control circuit 21. The circuit 21 in turn is supplied with synchronisation signals derived from received TV signals via a tuner, IF circuit, video amplifier and synchronisation separator circuits (not shown). Video information (data) signals are supplied to the column conductor 15 from an analogue shift register circuit 22, comprising one or more shift registers, acting as a sample and hold circuit. The circuit 22 is supplied with video signals from the video amplifier via a video processor 23 and timing pulses from the circuit 21 in synchronism with row scanning and provides serial to parallel conversion appropriate to the row at a time addressing of the panel 10. The row and column driver circuits 20 and 22 follow conventional practice in this respect.

The basic construction and operation of the display device is similar in many respects to that of conventional active matrix addressed liquid crystal display devices using a switching transistor for each picture element which have been widely documented elsewhere and accordingly it is considered unnecessary to describe here in detail the more general constructional and operational aspects of the display device.

The display device of the present invention differs from such conventional display devices in that, the switching transistors are not all of the same type and in that a separate row conductor 14 is not employed for each row of picture elements 12.

In accordance with the invention, the switching transistors 11 used in the display device are of both conductivity types. More particularly, alternate rows of n and p channel TFTs are used, the different types being designated simply by p and n in FIG. 1. Thus, the transistors 11 associated with the first row of picture elements consist of n-channel TFTs, the transistors associated with the second row consist of p-channel TFTs, the transistors associated with the third row consist of n-channel TFTs, and so on throughout all rows of the display device.

In addition, the transistors of respective pairs of adjacent rows of picture elements are controlled via a common row conductor 14. Thus, the gates of the n-channel and p-channel TFTs associated with the first two rows of picture elements are connected to the first row conductor 14, the gates of the n and p channel TFTs associated with the third and fourth rows of picture elements are connected to the second row conductor, and so on.

The number of row conductors 14 provided therefore corresponds to m/2.

Figure 2:
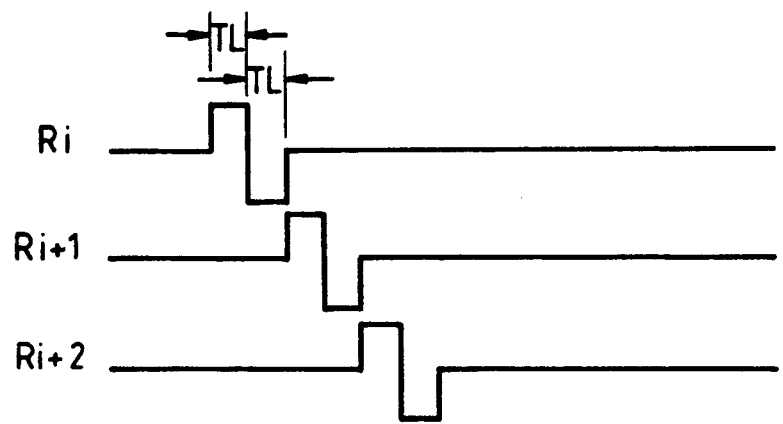
FIG. 2 illustrates the timing waveform for gating signals applied to a typical group of three successive row conductors of the display device.

The picture elements are addressed by applying gating signals to each row conductor 14 in turn. The gating signals applied to each row conductor consist of a pair of non-coincident and opposite polarity pulses, the two polarity pulses serving to turn on respectively the two types of transistor associated with the two rows of picture elements concerned. Referring to FIG. 2, examples of gating signals applied to three successive and typical row conductors 14, designated Ri, Ri+1, and Ri+2, are shown. The gating signals applied to Ri comprise a positive pulse which turns on the row of n-channel TFTs enabling their associated picture elements to be loaded with video signal voltage then present on the column conductors 15, but which does not turn on the p-channel TFTs. This is followed immediately by a negative pulse which turns on the row of p-channel TFTs enabling their associated picture elements to be loaded. The n-channel TFTs are turned off at the termination of the positive pulse (corresponding to the beginning of the negative pulse) thereby isolating the associated picture elements. At the termination of the negative pulse applied to Ri, or slightly thereafter, a positive pulse followed immediately by a negative pulse is applied to the next row conductor Ri+1 so as to enable loading of the next two rows of picture elements in succession with appropriate video signal voltages present on the column conductors 15 during the two pulses. Thereafter similar gating signals are applied to Ri+2 in identical manner. The duration of each positive or negative pulse corresponds to a line address period (Tl) in a conventional display and, in the case of a TV display, is equivalent to slightly less than a standard line period, i.e. 64 microseconds for a PAL standard display.

Rows of picture elements 12 are thus loaded on a line by line basis in the same order as the known display device and provide identical display effects.

The row driver circuit 20 providing the gating signals, and consisting of a digital shift register circuit, is similar to those used in known display devices but with appropriate modification to provide opposing polarity pulses as will be understood by persons skilled in the art.

In an alternative arrangement, two separate shift register driver circuits providing positive and negative pulses respectively may be connected to opposite ends of the row conductors 14 and synchronized so as to apply opposing polarity gating pulses in succession to each row conductor as required.

Figure 3:
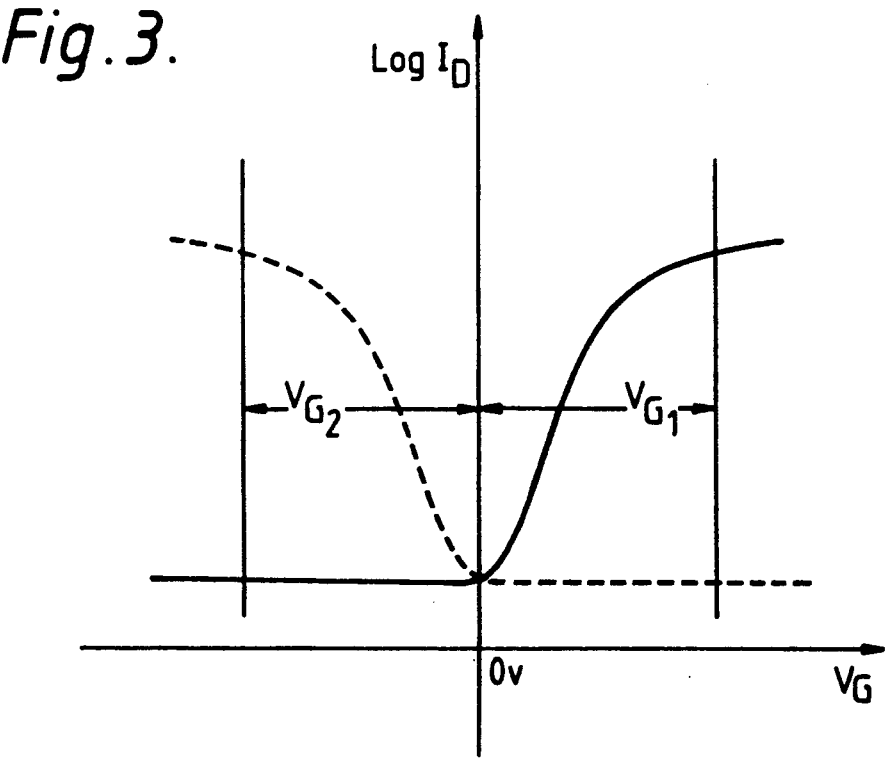
FIG. 3 illustrates graphically certain characteristics of the switching transistors used in the display device.

In order for the above-described drive scheme to work most effectively, it is recognized that the TFTs preferably have low leakage currents in their off states and well engineered transfer characteristics. These characteristics are illustrated in graphical form in FIG. 3, where the solid line represents an n-channel TFT, the dotted line represents a p-channel TFT, VG is the gate voltage, i.e. the gating signal pulse amplitude, and ID is the drain current for a fixed drain voltage $V_D$. Ideally then, both types of TFT should be off at $V_G=0$ volts, the n-channel TFTs should be on at VG1 for a range of drain voltages corresponding to the range of the video (data) signal, whilst the p-channel TFTs are maintained off under these conditions. Likewise, but in a symmetrically opposite sense, the p-channel TFTs should be on at VG2 over a corresponding range of volts, caused by drain voltage fluctuations in operation with the n-channel TFTs being off under these conditions.

The TFTs 11 in this embodiment comprise polysilicon TFTs and are formed on a glass or quartz substrate. These TFTs are doped as appropriate to provide n and p channel devices, using for example phosphorus and boron ion implantation respectively. Alternatively, a-Si TFTs formed on glass may be used, n and p types being made in situ using, for example, phosphine and diborane doping.

The two types of TFTs could be fabricated separately using NMOS and PMOS processes respectively. For simplicity however, the TFTs are formed using CMOS technology. Advantageously, the row driver circuit 20, (and possibly also the column driver circuit 22), is formed simultaneously with the TFTs 11 on the same substrate at a peripheral region, or regions in the case where separate row driver circuits are used to provide positive and negative gating pulses respectively, of the display panel 10 outside the active display area occupied by the picture elements. Using CMOS, driver circuits of reduced complexity and offering improved operation and greater stability can be obtained.

The row and column address conductors 14 and 15 are formed during TFT fabrication using polysilicon material, as is known practice in display devices employing polysilicon TFTs, although other materials such as metals, ITO, or silicides could be used instead both for polysilicon TFT devices and devices employing other forms of transistors. Because the number of row conductors 14 necessary compared with a conventional display is halved, the proportion of the panel area devoted to the row conductors is decreased. Consequently, for a given size of display panel having a certain number of picture elements, either the area of each picture element, as determined by its electrode on the substrate carrying the TFTs, can be increased, at least in the column direction, or alternatively duplicate row conductors could be provided for redundancy purposes whilst allowing the active display area to remain the same. The duplicate row conductor extends alongside its associated row conductor and is connected electrically in parallel therewith. The gates of each TFT for the two rows of picture elements concerned are connected to this duplicate row conductor as well. In the event of the primary row conductor proving defective, for example because of a short at the cross-over with a column conductor, the defective conductor, or a portion, may be disconnected from the circuit by laser scribing.

The p and n channel TFTs 11 could be produced other than by using polysilicon or amorphous silicon technology. For example, microcrystalline silicon, recrystallized semiconductor TFTs, for example formed by laser annealing polycrystalline silicon, amorphous silicon, or other semiconductor material, or TFTs using other semiconductor materials such as Cadmium sulphide may be used.

Moreover, the switching transistors need not be TFTs. They could instead comprise MOSFETs fabricated in a single crystal semiconductor, for example silicon, substrate constituting one substrate of the display panel 10. The terms MOSFET and MOS are used herein in their wider sense and are not intended to be limited exclusively to structures using metal-oxide components. Such an arrangement could be used in a reflective rather than transmissive mode of operation. The driver circuit 20 would likewise be integrated on the semiconductor substrate at a peripheral region or regions outside the active display area.

I claim:

1. A matrix display device comprising a row and column array of electro-optical picture elements defined by opposing electrodes with an electro-optical display medium disposed therebetween, and a switching transistor for each picture element to which switching and data signals are applied from driver means via a switching signal conductor and a data signal conductor, characterised in that for at least one pair of adjacent rows of picture elements the switching transistors associated with each row respectively are of opposite conductivity type and in that the switching transistors of both rows are connected to a common switching signal conductor to which switching signals for both types of switching transistors are supplied.

2. A matrix display device according to claim 1, wherein the opposite conductivity switching transistors comprise n and p channel TFTs fabricated on a common substrate.

3. A matrix display device according to claim 2, wherein the TFTs comprise polysilicon TFTs.

4. A matrix display according to claim 2, wherein the TFTs comprise amorphous silicon TFTs.

5. A matrix display device according to claim 2, wherein the TFTs comprise recrystallised semiconductor TFTs.

6. A matrix display device according to claim 1, wherein the opposite conductivity switching transistors comprise n and p channel MOSFETs fabricated on a semiconductor substrate.

7. A matrix display device according to claim 2 wherein the switching signals are provided by a switching signal driver circuit fabricated on the substrate carrying the switching transistors.

8. A matrix display device according to claim 7, wherein the switching transistors and the driver circuit are fabricated by a CMOS process.

9. A matrix display device according to claim 1 wherein the electro-optical picture elements comprise liquid crystal picture elements.

10. A matrix display device according to claim 3, wherein the switching signals are provided by a switching signal driver circuit fabricated on the substrate carrying the switching transistors.

11. A matrix display device according to claim 4, wherein the switching signals are provided by a switching signal driver circuit fabricated on the substrate carrying the switching transistors.

12. A matrix display device according to claim 5, wherein the switching signals are provided by a switching signal driver circuit fabricated on the substrate carrying the switching transistors.

13. A matrix display device according to claim 6, wherein the switching signals are provided by a switching signal driver circuit fabricated on the substrate carrying the switching transistors.

14. A matrix display device according to claim 10, wherein the switching transistors and the driver circuit are fabricated by a CMOS process.

15. A matrix display device according to claim 11, wherein the switching transistors and the driver circuit are fabricated by a CMOS process.

16. A matrix display device according to claim 12, wherein the switching transistors and the driver circuit are fabricated by a CMOS process.

17. A matrix display device according to claim 13, wherein the switching transistors and the driver circuit are fabricated by a CMOS process.

18. A matrix display device according to claim 2, wherein the electro-optical picture elements comprise liquid crystal picture elements.

19. A matrix display device according to claim 14, wherein the electro-optical picture elements comprise liquid crystal picture elements.

20. A matrix display device according to claim 17, wherein the electro-optical picture elements comprise liquid crystal picture elements.

* * * * *